United States Patent
Kalhous et al.

(10) Patent No.: US 9,167,394 B2
(45) Date of Patent: Oct. 20, 2015

(54) IN-VEHICLE MESSAGING

(75) Inventors: Amanda J. Kalhous, Ajax (CA); Neeraj Roy Gautama, Whitby (CA); Norman J. Weigert, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 136 days.

(21) Appl. No.: 13/532,124

(22) Filed: Jun. 25, 2012

(65) Prior Publication Data

US 2012/0329398 A1 Dec. 27, 2012

Related U.S. Application Data

(60) Provisional application No. 61/501,454, filed on Jun. 27, 2011.

(51) Int. Cl.
| | | |
|---|---|---|
| H04B 7/26 | (2006.01) |
| H04W 4/12 | (2009.01) |
| H04W 4/04 | (2009.01) |
| H04W 4/00 | (2009.01) |
| H04L 12/58 | (2006.01) |
| H04W 84/00 | (2009.01) |

(52) U.S. Cl.
CPC ............... *H04W 4/12* (2013.01); *H04W 4/046* (2013.01); *H04L 12/5895* (2013.01); *H04L 51/38* (2013.01); *H04W 4/008* (2013.01); *H04W 84/005* (2013.01)

(58) Field of Classification Search
None
See application file for complete search history.

(56) References Cited

U.S. PATENT DOCUMENTS

| 6,611,838 B1 * | 8/2003 | Ignat et al. ............................. 1/1 |
| 7,986,914 B1 * | 7/2011 | Henry et al. ................. 455/3.06 |
| 8,095,065 B2 | 1/2012 | Nagara et al. |
| 2003/0023353 A1 | 1/2003 | Badarneh |
| 2004/0214525 A1 * | 10/2004 | Ahn et al. .................... 455/41.2 |
| 2011/0087976 A1 * | 4/2011 | Cisler et al. ................... 715/762 |
| 2012/0039248 A1 * | 2/2012 | Schneider et al. ............ 370/328 |
| 2012/0272180 A1 * | 10/2012 | Larres et al. ................. 715/784 |

FOREIGN PATENT DOCUMENTS

| CN | 1424968 A | 6/2003 |
| DE | 19921533 C1 | 1/2001 |
| DE | 102005027492 A1 | 12/2006 |

OTHER PUBLICATIONS

Wikipedia, Event-driven architecture, 2010 https://web.archive.org/web/20100423132821/http://en.wikipedia.org/wiki/Event-driven_architecture.*
German Office Action for German Application Serial No. 10 2012 210 986.2 , Date Mailed Aug. 14, 2014, 8 pages.
Message Access Profile (MAP); Bluetooth Doc; Version V10r00; Date: Jun. 4, 2009; 80 pages.
Chinese Office Action for Chinese Application Serial No. 201210238284.9, Date Mailed Aug. 28, 2014, 8 pages.

* cited by examiner

*Primary Examiner* — Ping Hsieh
*Assistant Examiner* — James Yang
(74) *Attorney, Agent, or Firm* — Cantor Colburn LLP

(57) ABSTRACT

In-vehicle messaging includes intercepting an incoming communication on a mobile communication device. The incoming communication is received by a messaging application on the mobile communication device. The in-vehicle messaging also includes parsing the communication, associating elements of the communication with metadata of a digital music application, and transmitting the communication, as well as instructions for handling the communication, over a communication link between the mobile communication device and a vehicle stereo system for presentation on a component of the vehicle stereo system.

20 Claims, 5 Drawing Sheets

IN-VEHICLE MESSAGING

CROSS-REFERENCE TO RELATED APPLICATIONS

This patent application claims priority to U.S. Provisional Patent Application Ser. No. 61/501,454 filed Jun. 27, 2011 which is hereby incorporated herein by reference in its entirety.

FIELD OF THE INVENTION

The subject invention relates to mobile communications and, more particularly, to in-vehicle messaging.

BACKGROUND

Mobile communication devices, such as personal digital assistants PDAs) and smart phones, are advanced devices that offer much more functionality than the telephony features provided by their predecessors. Currently, these advanced mobile devices provide the ability to run complex applications based on a particular platform. There has been an increasing growth in demand for these devices due to their advanced computer processing capabilities and affordability.

As these devices are lightweight and portable, many users engage in communications while operating a vehicle. In addition to voice calls, popular forms of communications include instant messaging and text messaging. Instant and text messaging enable the user of the mobile communication device to compose a message in a text form via buttons on a keypad of the device that correspond to alphanumeric characters. Depending on the length of the message, composing a text-based communication requires near-constant visualization of the keypad by the user for a period of time sufficient to allow access of the messaging application on the device, identification or entry of an address to which the message will be sent, composition of the communication content, and selection of an option that directs the device to transmit the message. Thus, due to the requirement that the user visually focus on the device for a period of time, text and instant messaging are not conducive to situations that require extended visual and mental focus, such as operating a vehicle.

Accordingly, it is desirable to provide ways to enable in-vehicle messaging that minimizes the distractions typically associated with mobile communications devices.

BRIEF SUMMARY

In one exemplary embodiment of the invention, a system for in-vehicle messaging is provided. The system includes a computer processor and logic executable by the computer processor. The logic is configured to implement a method. The method includes intercepting an incoming communication on a mobile communication device. The incoming communication is received by a messaging application on the mobile communication device. The method also includes parsing the communication, associating elements of the communication with metadata of a digital music application, and transmitting the communication, as well as instructions for handling the communication, over a communication link between the mobile communication device and a vehicle stereo system for presentation on a component of the vehicle stereo system.

In another exemplary embodiment of the invention, a method for in-vehicle messaging is provided. The method includes intercepting an incoming communication on a mobile communication device. The incoming communication is received by a messaging application on the mobile communication device. The method also includes parsing the communication, associating elements of the communication with metadata of a digital music application, and transmitting the communication, as well as instructions for handling the communication, over a communication link between the mobile communication device and a vehicle stereo system for presentation on a component of the vehicle stereo system.

In a further exemplary embodiment of the invention, a computer program product for in-vehicle messaging is provided. The computer program product includes a computer-readable storage medium having instructions embodied thereon, which when executed by a computer, causes the computer to implement a method. The method includes intercepting an incoming communication on a mobile communication device. The incoming communication is received by a messaging application on the mobile communication device. The method also includes parsing the communication, associating elements of the communication with metadata of a digital music application, and transmitting the communication, as well as instructions for handling the communication, over a communication link between the mobile communication device and a vehicle stereo system for presentation on a component of the vehicle stereo system.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
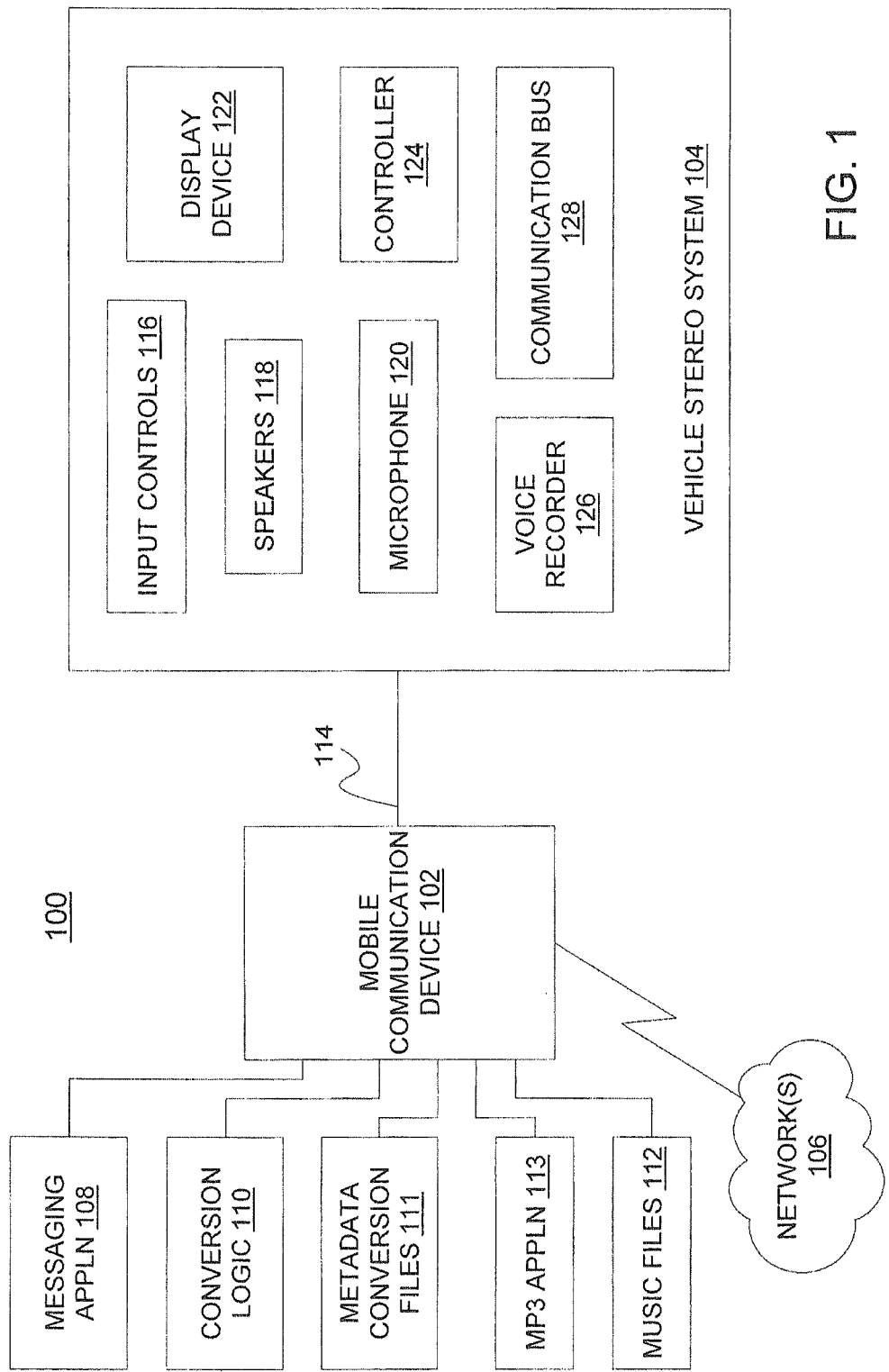
FIG. 1 is a system upon which in-vehicle messaging may be implemented in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, in-vehicle messaging is provided. The exemplary in-vehicle messaging features leverage the functionality of existing mobile messaging applications for use in a vehicle's infotainment system or stereo system to provide hands-free, in-vehicle communications. An operator of a vehicle can receive text or voice communications through his/her mobile communication device's messaging application, which are visually displayed or audibly presented via the vehicle's stereo system or infotainment system. In addition, the operator may initiate voice messages via the vehicle's stereo or infotainment system that works in conjunction with the messaging application to generate and transmit voice messages to recipients.

Turning now to FIG. 1, a system 100 upon which the in-vehicle messaging may be implemented in accordance with an exemplary embodiment will now be described. The system 100 includes a mobile communication device 102 in communication with a vehicle stereo system 104 and one or more networks 106.

The mobile communication device 102 may be a personal digital assistant (PDA) or cellular telephone. The mobile communication device 102 may be configured with enhanced 3G or 4G functionality (e.g., smart phone) and includes components typically associated therewith, such as an operating system, input/output controls, one or more computer processing units (CPUs), memory, communication bus, and wireless communication adapter, to name a few. In one embodiment, the mobile communication device 102 may include a voice recorder 126.

The mobile communication device 102 executes applications, such as a digital music application 113, a web browser, voicemail, etc. The digital music application 113 enables the mobile communication device 102 to play music files, which may be stored in a variety of formats, such as .mp3, .wav, .amr, etc. In an embodiment, the mobile communication device 102 also executes a messaging application 108. Some of the applications may be implemented over a cellular communication network (e.g., one of the networks 106), and some of the applications may be implemented over a data network (e.g., another of the networks 106), which may include the Internet. In an alternative embodiment, communications to and from the mobile communication device 102 may be implemented over a Wifi network (e.g., one of the networks 106) if the mobile communication device 102 is in range thereof.

The messaging application 108 may be an instant messaging tool or a text messaging tool (e.g., BLACKBERRY MESSENGER™). In an exemplary embodiment, the mobile communication device 102 further executes conversion logic 110 that is configured to work in conjunction with the messaging application 108 and the digital music application 113 to implement the in-vehicle messaging features described herein. The conversion logic 110 may be implemented as an application that is executable by the mobile communication device 102.

The memory may store the applications including the messaging application 108, conversion logic 110, and the digital music application 113. In an embodiment, the memory also stores metadata conversion files 111 and music files 112 (e.g., one or more songs downloaded to the mobile communication device 102). The metadata conversion files 111 include mappings of metadata between the messaging application 108 and the digital music application 113, as described further herein. In another embodiment, the mobile communication device 102 may execute an application for enabling a user of the device 102 to stream Internet radio to the device (e.g., Pandora® radio).

The wireless network adapter enables the mobile communication device 102 to communicate over one or more networks, such as networks 106. In one embodiment, the mobile communication device 102 is configured with various communication protocols (e.g., WI-FI™, BLUETOOTH™) for enabling various wireless communications between the mobile communication device 102 and the vehicle stereo system 104. The communications may occur wirelessly or in a wired fashion (e.g., via a universal serial bus (USB) cable) via a communication link 114, as will be described further herein.

The mobile communication device 102 may engage in communications with other devices over the networks 106 via the messaging application 108. In an exemplary embodiment, the mobile communication device 102 is configured to engage in in-vehicle messaging with other devices over the networks 106 via the messaging application 108, the conversion logic 110, and the vehicle stereo system 104.

The vehicle stereo system 104 may be an infotainment system that provides a variety of entertainment options, or may be a radio device that is BLUETOOTH™ enabled to communicate with wireless devices, such as mobile communication device 102. Alternatively, the mobile communication device 102 may communicate with the vehicle stereo system 104 using a USB cable. As indicated above, the connection between the mobile communication device 102 and the vehicle stereo system 104 is referred to herein as a communication link 114.

In an embodiment, the vehicle stereo system 104 includes input controls 116, speakers 118, and a microphone 120. The input controls 116 may be buttons or similar physical elements (e.g., power switch, volume control, advance/reverse content selection options, etc.) selectable by a vehicle occupant to control the operation of entertainment features provided by the vehicle stereo system 104. The speakers 118 are communicatively coupled to components of the vehicle stereo system 104 to receive, amplify, and present audio (e.g., live or recorded music, audio books, and voice communications) to the occupant of the vehicle. The microphone 120 receives voice communications from the vehicle occupant and may be implemented, e.g., using existing vehicle features, such as ONSTAR™.

In an embodiment, the vehicle stereo system 104 also includes a display device 122 and a controller 124. The display device 122 displays information through the infotainment features offered by the vehicle stereo system 104, such as radio data (e.g., station identifier for currently tuned in music station), recorded data from a medium (e.g., track and song information for recorded music, etc.), and/or navigation information for a global positioning system component, to name a few. The controller 124 may be implemented via one or more computer processing units (CPUs) that receive and process commands to and from the vehicle stereo system 104, as well as provide traffic management for communications occurring within the vehicle stereo system 104 (e.g., among its internal components).

The input controls 116, speakers 118, microphone 120, display device 122 and the controller 124 may communicate with one another other over a communication bus 128.

As indicated above, the exemplary in-vehicle messaging leverages the functionality of a messaging application and a digital music player application for a mobile communication device. The conversion logic 110 maps metadata of the messaging application 108 to metadata of the digital music application 113 and presents in-vehicle messages to vehicle occupants through the mobile communication device 102 and messaging application 108.

The conversion logic 110 identifies metadata associated with the messaging application 108, maps the messaging application's 108 metadata to metadata associated with the digital music application 113, and stores the mappings in the metadata conversion files 111. With respect to the messaging application 108 and the digital music application 113, a non-limiting example of such mappings may include the following:

messaging contact folder may be mapped to digital music playlist;

messaging contact may be mapped to digital music song title;

messaging contact profile image may be mapped to digital music album or graphic art;

message text may be mapped to song attributes.

In addition, the conversion logic 110 may be configured such that a portion of the metadata associated with song attributes may include messaging response and creation instructions, along with associations to existing vehicle controls. For example, a control option (e.g., one of the input controls 116) typically used to execute the function 'select song' may be associated with 'select contact.' A control option used to execute the function 'select previous song in playlist' may be associated with 'start or stop recording voice note.' A control option used to execute the function 'select next song in playlist' may be associated with 'send voice note recording.' Some of the control options may be disposed on a vehicle dashboard in proximity of the vehicle stereo system 104 components or may be integrated within a steering wheel of the vehicle. In an alternative embodiment, the control options may be enabled by voice commands and/or touch screen features on the display device 122, if the vehicle stereo system 104 is so equipped.

Figure 2:
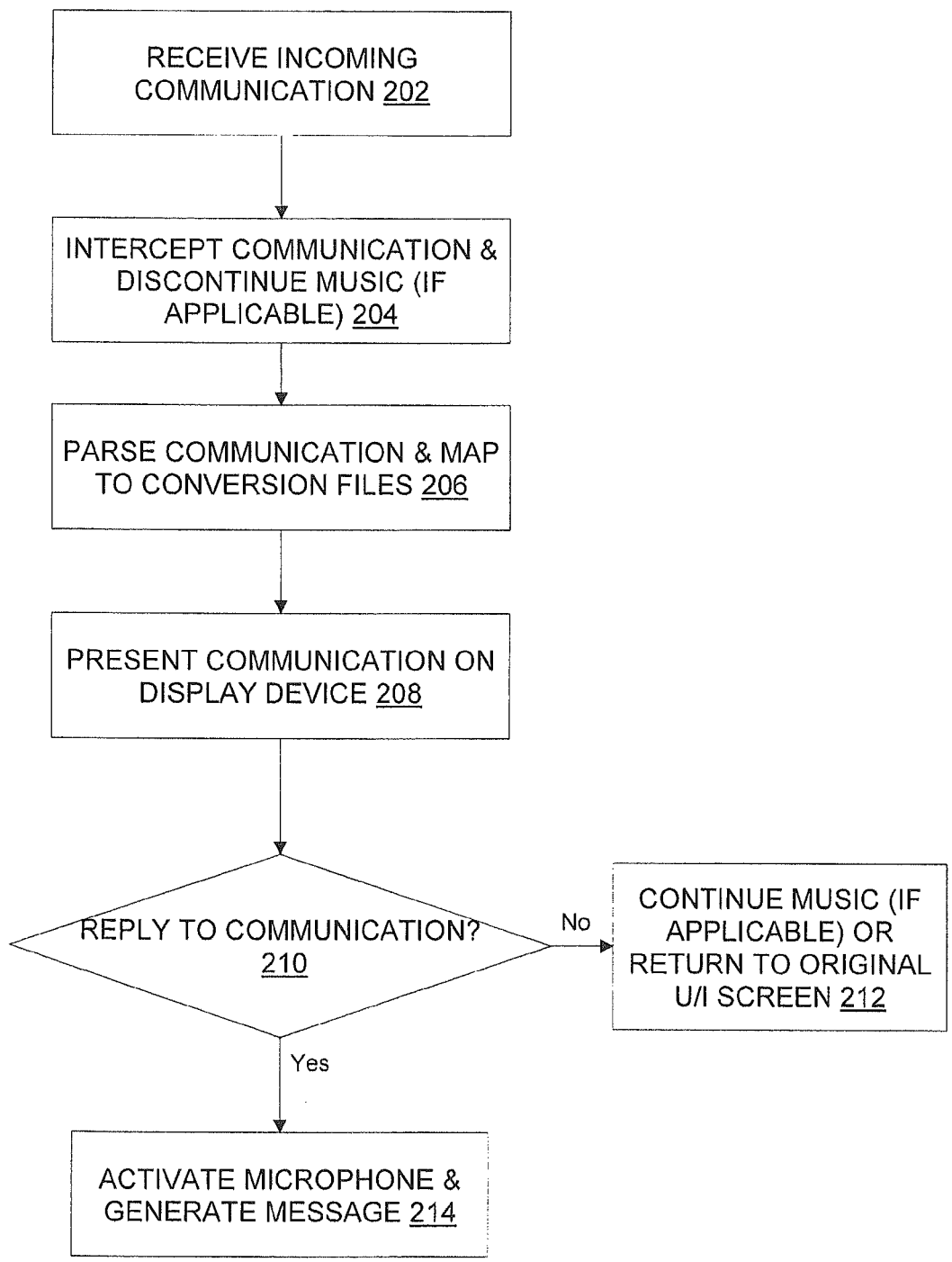
FIG. 2 is a flow diagram describing a process for implementing in-vehicle messaging in accordance with an exemplary embodiment.

Turning now to FIG. 2, a flow diagram describing a process for implementing the in-vehicle messaging features in accordance with an exemplary embodiment will now be described.

Figure 3:
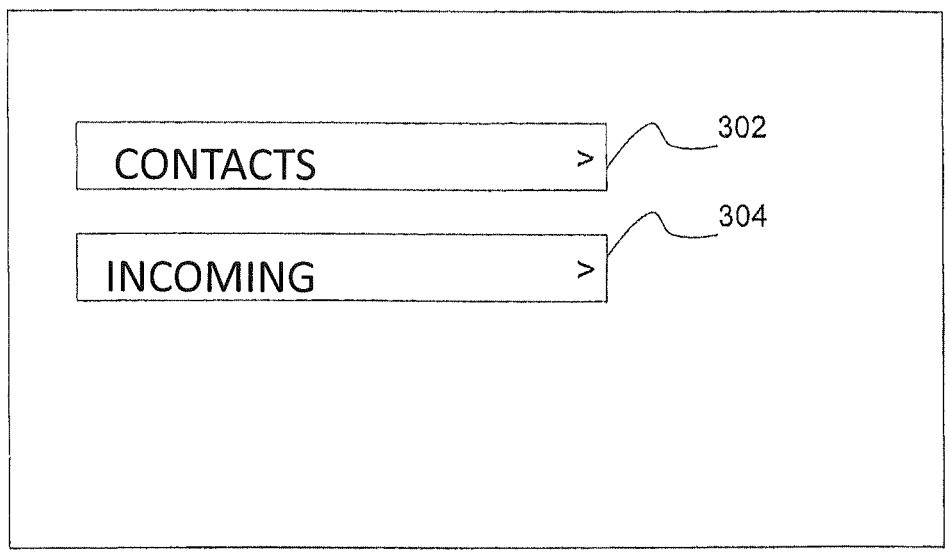
FIG. 3 is a user interface screen implemented by the in-vehicle messaging in accordance with an exemplary embodiment.

At step 202, a vehicle operator receives an incoming communication via the mobile communication device's 102 messaging application 108. A sample user interface screen 300 in FIG. 3 illustrates a notification of an incoming communication 304 presented on the display device 122. The operator selects an option for presenting the incoming communication 304 on the display device 122. The communication is intercepted by the conversion logic 110 at step 204. If music is current playing on the vehicle stereo system 104 through the digital music application 113, the conversion logic 110 sends a command to the digital music application 113 (e.g., via the operating system of the mobile communication device 102) to discontinue playing the music. The command may be transmitted from the mobile communication device 102 via the communication link 114. Alternatively, the operator may be informed of an incoming message and may be solicited to act to enable the message to appear, for example, by means of switching songs via a corresponding input control 116.

The conversion logic 110 parses the communication using the conversion files 111 to identify which elements of the communication will be mapped to which metadata of the digital music application 113 at step 206. If the communication is a recorded voice note, the recording may be queued by the controller 124 and instructions for 'playing' the voice note is mapped to the 'song attributes' metadata of the digital music application 113.

Figure 7:
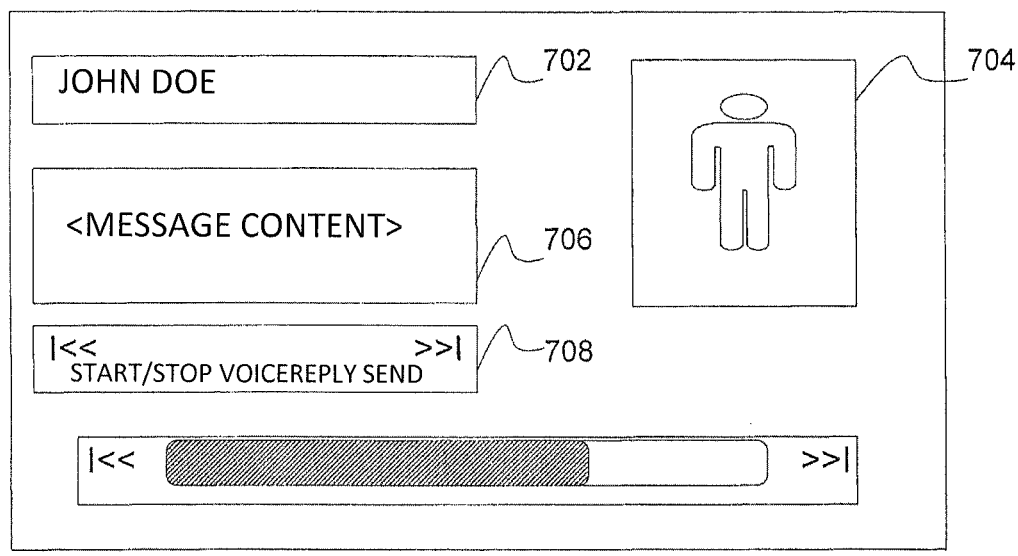
FIG. 7 is a user interface screen implemented by the in-vehicle messaging in accordance with another exemplary embodiment.

At step 208, the communication is transmitted over the communication link 114 to the vehicle stereo system 104 and presented on the display device 122. For text-based communications, a sample user interface screen 700 of FIG. 7 illustrates the sender's name 702, an image 704 associated with the sender (e.g., a picture of the sender or an avatar), the body of the message 706 and message creation instructions 708. By way of non-limiting example, the metadata 'genre' of the digital music application 113 may be mapped to the sender's name 702, the metadata 'artist and song title' may be mapped to the body of the message 706, the metadata 'album art' may be mapped to the image 704, and the metadata 'album name' may be mapped to the message creation instructions 708.

Figure 6:
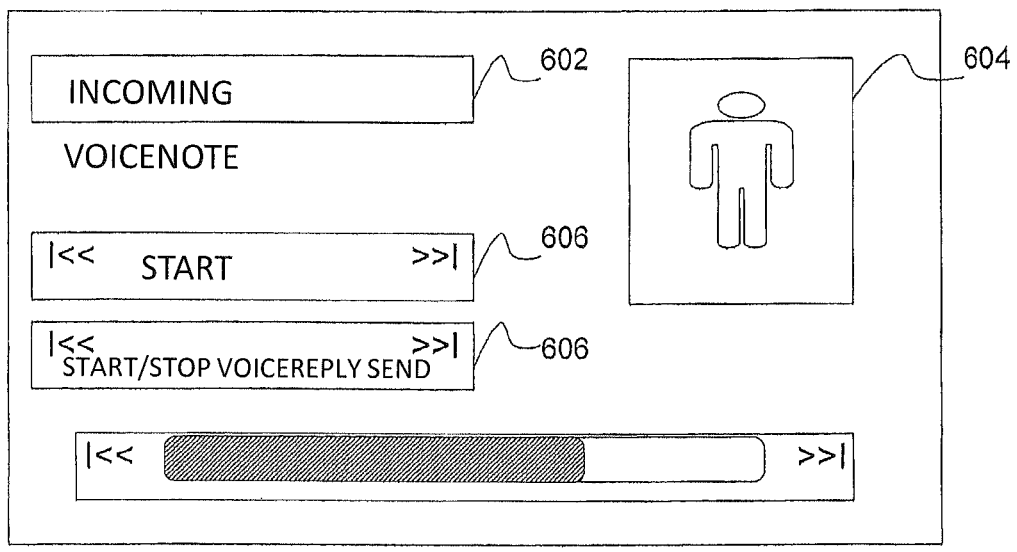
FIG. 6 is a user interface screen implemented by the in-vehicle messaging in accordance with yet another exemplary embodiment.

For voice notes, a sample user interface screen 600 of FIG. 6 illustrates a notification of the voice note 602. In an embodiment, the user interface screen 600 also displays an image 604 associated with the sender and message presentation and response instructions 606. By way of non-limiting example, the metadata 'genre' of the digital music application 113 may be mapped to the notification of voice note 602, the metadata 'album art' may be mapped to the image 604, and the metadata 'album name' may be mapped to the message presentation and response instructions 606.

The vehicle occupant may view the text of the communication via the display device 122 or select a corresponding input control 116 to play a voice note of the communication via the speakers 118. The user interfaces 700 and 600 may also include metadata provided by the conversion logic 110 that include instructions on replying to the message, as described further herein.

As indicated above, the in-vehicle messaging not only enables a vehicle operator to receive communications, but also to reply to communications, as well as to initiate new communications. The operator may receive instructions via the display device 122 to respond to the communication.

If the operator does not wish to respond to the communication at step 210, the operator selects a corresponding input control 116 as directed by the conversion logic 110 (e.g., metadata provided by the conversion logic 110). If music was playing on the vehicle stereo system 104 prior to receiving the communication, the conversion logic 110 sends an instruction to the digital music application 113 to continue playing the music at step 212. Alternatively, the original user interface screen (e.g., any user interface presented prior to the notification of the incoming communication) is returned to the display device 122.

If the operator wishes to reply to the communication at step 210, the operator selects a corresponding input control 116 according to the instructions provided on the display device 122 (e.g., via the instructions 606 of FIG. 6 and/or instructions 708 of FIG. 7) via the conversion logic 110, and the conversion logic 110 sends a command to the vehicle stereo system 104 to activate the microphone 120 at step 214. In an alternative embodiment, e.g., if the vehicle stereo system 104 is not equipped with a microphone, the conversion logic 110 may instruct the operator (e.g., via a display on the mobile communication device 102) to activate a voice recorder 126 on the mobile communication device 102).

Figure 5:
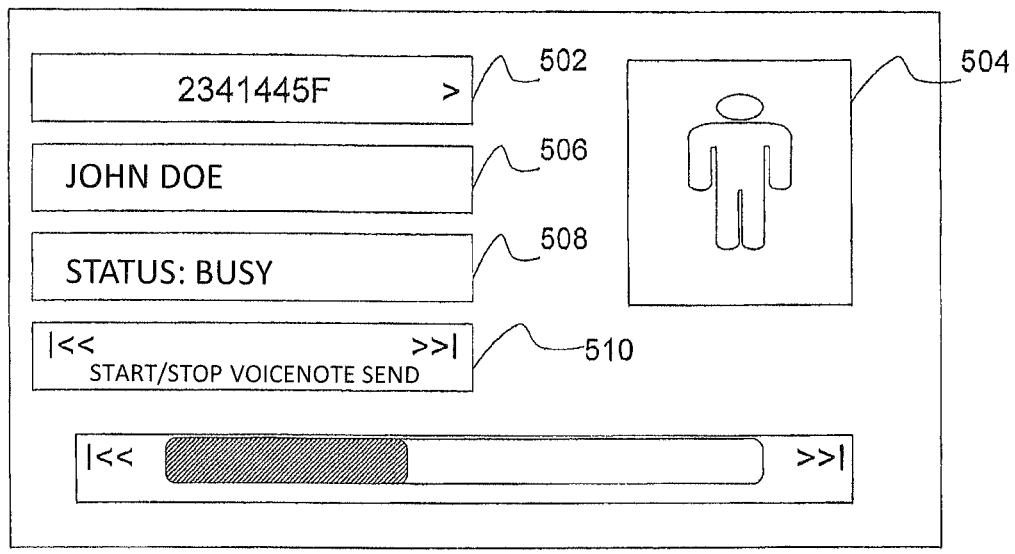
FIG. 5 is a user interface screen implemented by the in-vehicle messaging in accordance with a further exemplary embodiment.

A sample user interface screen 500 of FIG. 5 illustrates how the operator initiates a new message to an existing contact. The conversion logic 110 receives the voice data from the vehicle stereo system 104 and generates a communication via the messaging application 108 using the sender information provided in the messaging application 108, as well as the voice data. In an alternative embodiment, the voice data may be converted to text (e.g., via a text-to-speech component if enabled by either the vehicle stereo system 104 or the mobile communication device 102). The user interface screen 500 may display a personal identification number 502 of the operator, an image 504 of the individual that is subject to an unsuccessful communication attempt, a name 506 of the individual, and a status 508 of the communication attempt (e.g., "busy"). The user interface screen 500 also includes instructions 510 for assisting the operator in creating a message when the target individual is not available. The operator selects an input control 116 as instructed by the conversion logic 110, which causes the messaging application 108 to transmit the reply communication over the network 106.

Figure 4:
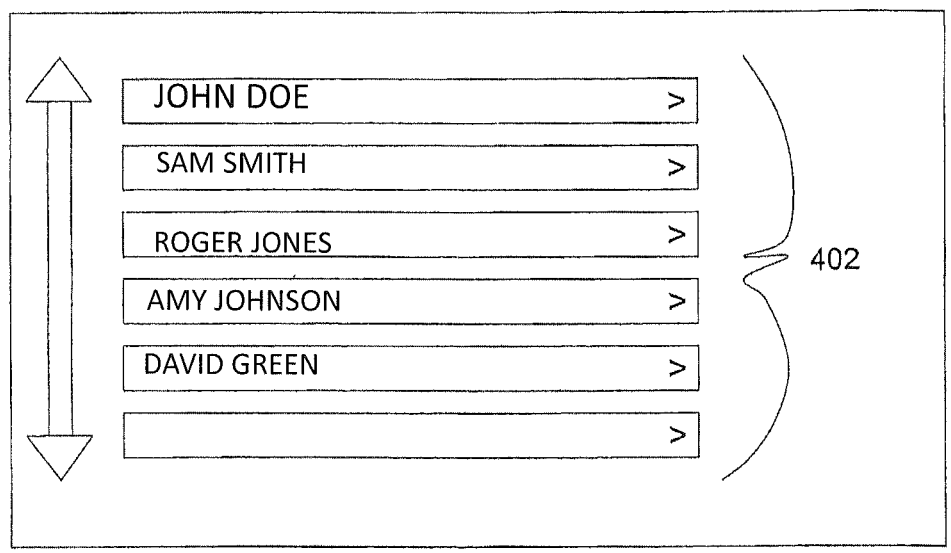
FIG. 4 is a user interface screen implemented by the in-vehicle messaging in accordance with another exemplary embodiment.

In an embodiment, the operator may also generate a new communication using the messaging application 108 and conversion logic 110. In this embodiment, it is assumed that the operator has previously entered contact information that is stored in the mobile communication device 102 and accessed as needed by the messaging application 108. The operator selects a contact folder from the display device 122 via the 'playlist' option (e.g., option 302 of FIG. 3), followed by selecting a contact. A sample user interface screen 400 of FIG. 4 illustrates a contact listing 402. The messaging application 108 populates a new message with the contact information. The operator selects an input control 116 according to the instructions provided on the display device 122 via the conversion logic 110 and the microphone 120 is activated. The raw voice data is transmitted to the messaging application 108 over the communication link 114, and the messaging application 108 creates a voice file (e.g., an .amr, .wav. or .mp3 file). The operator selects an input control 116 according to the instructions provided on the display device 122 via the conversion logic 110 and the messaging application 108 transmits the reply message to the selected contact.

Technical effects of the in-vehicle messaging features leverage the functionality of existing mobile messaging applications for use in a vehicle's infotainment system or stereo system to provide hands-free in-vehicle communications. An operator of a vehicle can receive text or voice communications through his/her mobile communication device's messaging application, which are visually displayed or audibly presented via the vehicle's stereo system or infotainment system. In addition, the operator may initiate voice messages via the vehicle's stereo or infotainment system that works in conjunction with the messaging application to generate and transmit voice messages to recipients.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the application.

The invention claimed is:

1. A system, comprising:
a computer processor communicatively coupled to a vehicle stereo system and a mobile communication device, a display component of the vehicle stereo system configured to display communications received by the vehicle stereo system from the mobile communication device; and
logic executable by the computer processor, the logic configured to:
intercept an incoming communication on the mobile communication device, the incoming communication received by a messaging application;
parse the communication into elements;
associate the elements with metadata of a digital music application, the elements associated by a mapping function that maps metadata of the messaging application to metadata of the digital music application;
implement a mapping between a communication response function attributed to the messaging application with respect to the communication and a vehicle input control option of the vehicle stereo system that is configured to perform a function associated with the digital music application, the communication response function identifying options for responding to the communication; and
transmit the communication, and instructions for handling the communication that correspond to the mapping, over a communication link between the mobile communication device and the vehicle stereo system for visual presentation on the display component of the vehicle stereo system responsive to selection of the vehicle input control option, the instructions for handling the communication including instructions for implementing the options for responding to the communication, the options including a user-generated reply message.

2. The system of claim 1, wherein the logic is further configured to:
store results of mapped metadata of the messaging application to the metadata of the digital music application in a conversion file;
wherein associating the elements of the communication to the metadata of the digital music application is performed using mappings stored in the conversion file.

3. The system of claim 2, wherein the metadata of the messaging application includes a message contact folder, and the metadata of the digital music application includes a digital music playlist;
wherein mapping the metadata includes mapping the message contact folder to the digital music playlist in the conversion file.

4. The system of claim 2, wherein the metadata of the messaging application includes a message contact, and the metadata of the digital music application includes a digital music song title;
wherein mapping the metadata includes mapping the message contact to the digital music song title in the conversion file.

5. The system of claim 2, wherein the metadata of the messaging application includes message text, and the metadata of the digital music application includes song attributes;
wherein mapping the metadata includes mapping the message text to the song attributes in the conversion file.

6. The system of claim 2, wherein the metadata of the messaging application includes a contact profile image and the metadata of the digital music application includes at least one of a digital music album cover and graphical art;
   wherein mapping the metadata includes mapping the contact profile image to the at least one of the digital music album cover and the graphical art in the conversion file.

7. The system of claim 2, wherein the incoming communication is a recorded voice note and instructions for playing the recorded voice note is mapped to song attributes of the digital music application.

8. The system of claim 1, wherein the logic is further configured to:
   discontinue transmission of music from the digital music application to the vehicle stereo system responsive to the intercepting.

9. The system of claim 1, wherein the communication link is one of a short-range wireless interface and a universal serial bus cable.

10. The system of claim 1, wherein the messaging application is one of a text messaging application and an instant messaging application.

11. A method, comprising:
   intercepting, via a computer processor communicatively coupled to a vehicle stereo system and a mobile communication device, an incoming communication on the mobile communication device, the incoming communication received by a messaging application, a display component of the vehicle stereo system configured to display communications, including the incoming communication, received by the vehicle stereo system from the mobile communication device;
   parsing the communication into elements;
   associating the elements with metadata of a digital music application, the elements associated by a mapping function that maps metadata of the messaging application to metadata of the digital music application;
   mapping a communication response function attributed to the messaging application with respect to the communication to a vehicle input control option of the vehicle stereo system that is configured to perform a function associated with the digital music application, the communication response function identifying options for responding to the communication; and
   transmitting the communication, and instructions for handling the communication that correspond to the mapping, over a communication link between the mobile communication device and the vehicle stereo system for visual presentation on the component of the vehicle stereo system responsive to selection of the vehicle input control option, the instructions for handling the communication including instructions for implementing the options for responding to the communication, the options including a user-generated reply message.

12. The method claim 11, further comprising:
   storing results of the mapping metadata of the messaging application to the metadata of the digital music application in a conversion file;
   wherein the associating elements of the communication to the metadata of the digital music application is performed using the mappings stored in the conversion file.

13. The method of claim 12, wherein the metadata of the messaging application includes a message contact folder, and the metadata of the digital music application includes a digital music playlist;
   wherein the mapping metadata includes mapping the message contact folder to the digital music playlist in the conversion file.

14. The method of claim 12, wherein the metadata of the messaging application includes a message contact, and the metadata of the digital music application includes a digital music song title;
   wherein the mapping metadata includes mapping the message contact to the digital music song title in the conversion file.

15. The method of claim 12, wherein the metadata of the messaging application includes message text and the metadata of the digital music application includes song attributes;
   wherein the mapping metadata includes mapping the message text to the song attributes in the conversion file.

16. The method of claim 12, wherein the metadata of the messaging application includes a contact profile image and the metadata of the digital music application includes at least one of a digital music album cover and graphical art;
   wherein the mapping metadata includes mapping the contact profile image to the at least one of the digital music album cover and the graphical art in the conversion file.

17. The method of claim 12, wherein the incoming communication is a recorded voice note and instructions for playing the recorded voice note is mapped to song attributes of the digital music application.

18. The method of claim 11, further comprising:
   discontinuing transmission of music from the digital music application to the vehicle stereo system responsive to the intercepting.

19. A computer program product comprising a non-transitory computer-readable storage medium having instructions embodied thereon, which when executed by a computer, cause the computer to:
   intercept an incoming communication on a mobile communication device, the incoming communication received by a messaging application, the mobile communication device communicatively coupled to a vehicle stereo system and the computer, and a display component of the vehicle stereo system is configured to display communications, including the incoming communication, received by the vehicle stereo system from the mobile communication device;
   parse the communication into elements;
   associate the elements with metadata of a digital music application, the elements associated by a mapping function that maps metadata of the messaging application to metadata of the digital music application;
   implement a mapping between a communication response function attributed to the messaging application with respect to the communication and a vehicle input control option of the vehicle stereo system that is configured to perform a function associated with the digital music application, the communication response function identifying options for responding to the communication; and
   transmit the communication, and instructions for handling the communication that correspond to the mapping, over a communication link between the mobile communication device and the vehicle stereo system for visual presentation on the component of the vehicle stereo system responsive to selection of the vehicle input control option, the instructions for handling the communication including instructions for implementing the options for responding to the communication, the options including a user-generated reply message.

20. The system of claim 2, wherein the logic is further configured to:
    associate a message creation function of the messaging application with a physical control option of the vehicle stereo system via the conversion file.

* * * * *